(12) United States Patent
Wang et al.

(10) Patent No.: US 11,953,120 B2
(45) Date of Patent: Apr. 9, 2024

(54) CHAMPAGNE TOWER-TYPE MULTI-STAGE THROTTLE CONTROL VALVE

(71) Applicant: HEFEI GENERAL MACHINERY RESEARCH INSTITUTE CO., LTD, Hefei (CN)

(72) Inventors: Wei Wang, Hefei (CN); Fengguan Chen, Hefei (CN); You Ming, Hefei (CN); Hongbing Yu, Hefei (CN); Shengtao Geng, Hefei (CN); Xiaojie Ye, Hefei (CN); Qin Wang, Hefei (CN)

(73) Assignee: HEFEI GENERAL MACHINERY RESEARCH INSTITUTE CO., LTD, Hefei (CN)

( * ) Notice: Subject to any disclaimer, the term of this patent is extended or adjusted under 35 U.S.C. 154(b) by 94 days.

(21) Appl. No.: 17/790,108

(22) PCT Filed: Mar. 11, 2021

(86) PCT No.: PCT/CN2021/080131
§ 371 (c)(1),
(2) Date: Jun. 29, 2022

(87) PCT Pub. No.: WO2021/180151
PCT Pub. Date: Sep. 16, 2021

(65) Prior Publication Data
US 2023/0052558 A1    Feb. 16, 2023

(30) Foreign Application Priority Data
Mar. 13, 2020 (CN) .......................... 202010173265.7

(51) Int. Cl.
*F16K 47/04* (2006.01)
*F16K 1/36* (2006.01)

(52) U.S. Cl.
CPC ................ *F16K 47/04* (2013.01); *F16K 1/36* (2013.01)

(58) Field of Classification Search
CPC .......................... F16K 47/04–045; F16K 1/36
(Continued)

(56) References Cited

U.S. PATENT DOCUMENTS 3,243,157 A * 3/1966 Beck ........................ F16K 47/04
                                                    137/340
3,485,474 A * 12/1969 Baumann ................ F16K 47/04
                                                    251/121

(Continued)

FOREIGN PATENT DOCUMENTS

CN         202868036 U      4/2013
CN         203131204 U      8/2013
(Continued)

*Primary Examiner* — John Bastianelli
(74) *Attorney, Agent, or Firm* — Bayramoglu Law Offices LLC

(57) ABSTRACT

A champagne tower-type multi-stage throttle control valve includes a valve body, a valve cover, a throttle sleeve, and a valve core. A sleeve cavity of the throttle sleeve is shaped as a stepped hole with two or more layers. The valve core is shaped as a stepped shaft with two or more layers coaxial with the throttle sleeve. The number of shaft shoulders of the valve core is smaller than or equal to the number of hole shoulders of the sleeve cavity of the throttle sleeve, such that each set of shaft shoulders of the valve core in an axial direction can form a sealing surface fit with corresponding hole shoulders of the throttle sleeve. A flow channel groove is axially or obliquely formed on each of the hole shoulders of the throttle sleeve and/or the shaft shoulders of the valve core.

19 Claims, 5 Drawing Sheets

(58) Field of Classification Search
USPC .......................................................... 251/127
See application file for complete search history.

(56) References Cited

U.S. PATENT DOCUMENTS

| | | | | | |
|---|---|---|---|---|---|
| 3,637,188 | A | * | 1/1972 | Ung | .......... F16K 47/04 251/266 |
| 4,044,991 | A | * | 8/1977 | Waller | .......... F16K 47/06 251/126 |
| 4,044,992 | A | * | 8/1977 | Jukoff | .......... F16K 47/06 251/126 |
| 4,363,464 | A | * | 12/1982 | Spils | .......... F16K 47/04 251/266 |
| 4,494,731 | A | * | 1/1985 | Spils | .......... F16K 47/04 251/266 |
| 4,504,040 | A | * | 3/1985 | Spils | .......... F16K 47/04 251/127 |
| 5,113,908 | A | | 5/1992 | Steinke | |
| 8,585,011 | B2 | * | 11/2013 | Caprera | .......... F16K 47/08 137/625.3 |
| 9,556,970 | B2 | * | 1/2017 | Mastrovito | .......... F16K 47/04 |

FOREIGN PATENT DOCUMENTS

| | | |
|---|---|---|
| CN | 205605856 U | 9/2016 |
| CN | 206112247 U | 4/2017 |
| CN | 111473155 A | 7/2020 |

\* cited by examiner

CHAMPAGNE TOWER-TYPE MULTI-STAGE THROTTLE CONTROL VALVE

CROSS REFERENCE TO THE RELATED APPLICATIONS

This application is the national phase entry of International Application No. PCT/CN2021/080131, filed on Mar. 11, 2021, which is based upon and claims priority to Chinese Patent Application No. 202010173265.7, filed on Mar. 13, 2020, the entire contents of which are incorporated herein by reference.

TECHNICAL FIELD

The present invention relates to the field of valves, and in particular to a champagne tower-type multi-stage throttle control valve with noise reduction and cavitation damage resistance for a high-pressure-difference medium.

BACKGROUND

Multi-stage throttle control valves are the most important link in automatic control, and thus the reliability and adjustment accuracy thereof will affect the safety and quality of automatic operation of a system. With the continuous development of the process industry, there are more and more working conditions where a large pressure difference of a medium needs to be controlled in processes. If a pressure difference of a medium is large, it is easy to cause vibration noise, cavitation damage, and other phenomena, resulting in serious damage to a trim of a multi-stage throttle control valve.

The multi-stage throttle control valves in the prior art mainly have two structural styles, namely, sleeve-type multi-stage control valves and labyrinth-type multi-stage control valves. In the sleeve-type multi-stage control valves, a plurality of coaxial sleeves are sleeved outside a valve core, a plurality of holes are formed in each sleeve, and the plurality of sleeves are superimposed for multi-stage pressure reduction. The labyrinth-type multi-stage control valves adopt a labyrinth disc-stacked structure, where a multi-stage bending flow channel is formed on the disc, such that a resistance coefficient of the disc is improved through the multi-stage bending flow channel. The above-mentioned traditional multi-stage pressure-reducing control valves can play a role of throttle control to some degree, but also face the following problems: Due to the limited structures and sizes of the sleeve-type multi-stage control valves, only a relatively small number of pressure reduction stages can be set, and thus the sleeve-type multi-stage control valves cannot be used in complex throttle occasions. On the contrary, the labyrinth-type multi-stage control valves have a relatively-complex structure, are very difficult to manufacture, and involve a high use cost. In addition, because a flow channel of a labyrinth-type multi-stage control valve often have a small size, the flow of a fluid in the flow channel encounters many detours and bends, and a flow hole or the flow channel is at a high risk of blockage. Once the flow hole or flow channel is blocked and cannot be quickly unblocked, the performance of a valve will be reduced, and the valve may even fail in severe cases, which will bring many troubles to practical use.

SUMMARY

The present invention is intended to overcome the above-mentioned deficiencies of the prior art and provide a champagne tower-type multi-stage throttle control valve. The champagne tower-type multi-stage throttle control valve of the present invention has a compact and simple structure, exhibits high operational reliability, effective noise reduction and cavitation damage resistance, and can further reduce the manufacturing difficulty and cost of the valve. The champagne tower-type multi-stage throttle control valve is particularly suitable for control conditions involving a high-pressure-difference medium.

To achieve the above objective, the present invention adopts the following technical solutions:

A champagne tower-type multi-stage throttle control valve is provided, including a valve body and a valve cover covering the valve body, where the valve cover and an inner cavity of the valve body together enclose a valve cavity for arranging a throttle sleeve and a valve core; a fluid inlet and a fluid outlet that communicate with an external environment penetrate through the valve cavity; the valve core is inserted into a sleeve cavity of the throttle sleeve, such that, after a medium enters through the fluid inlet, the medium can flow to the fluid outlet through a fluid passage formed between the throttle sleeve and the valve core; the sleeve cavity of the throttle sleeve is shaped as a stepped hole with two or more layers; the valve core is shaped as a stepped shaft with two or more layers coaxial with the throttle sleeve; a number of shaft shoulders of the valve core is smaller than or equal to a number of hole shoulders of the sleeve cavity of the throttle sleeve, such that each set of shaft shoulders of the valve core in an axial direction can form a sealing surface fit with corresponding hole shoulders of the throttle sleeve; a flow channel groove is axially or obliquely formed on each of the hole shoulders of the throttle sleeve and/or the shaft shoulders of the valve core, and a flow channel groove on the hole shoulder and a flow channel groove on the shaft shoulder are spaced away from each other; and when the valve core produces an axial displacement action relative to the throttle sleeve until a sealing surface is exposed, the sealing surface formed by the hole shoulders of the throttle sleeve and the shaft shoulders of the valve core that match each other communicates with the flow channel grooves to form the fluid passage.

Preferably, from an inlet end of the fluid passage to an outlet end of the fluid passage, a total throttle area of a flow channel groove on a stepped shaft section of each layer of the valve core may increase stage by stage; and flow channel grooves on a stepped shaft section of a same layer may be axially and evenly distributed around an axis of the valve core, and flow channel grooves on stepped shaft sections of adjacent layers may be evenly staggered from each other.

Preferably, a length of a flow channel groove on a stepped shaft section of each layer of the valve core may be smaller than an axial length of the stepped shaft section of the current layer, such that the flow channel groove is shaped as a straight key groove with a tail end closed.

Preferably, a length of a flow channel groove on a stepped shaft section of each layer of the valve core may be smaller than an axial length of the stepped shaft section of the current layer, such that the flow channel groove is shaped as an oblique groove of which a tail end is closed and a groove length direction forms an included angle with an axial direction of the valve core; and inclination directions of flow channel grooves on stepped shaft sections of two adjacent layers may be opposite to each other.

Preferably, a length of a flow channel groove on a stepped shaft section of each layer of the valve core may be equal to an axial length of the stepped shaft section of the current layer, such that the flow channel groove is shaped as a straight through-groove.

Preferably, a length of a flow channel groove on a stepped shaft section of each layer of the valve core may be equal to an axial length of the stepped shaft section of the current layer, such that the flow channel groove is shaped as an oblique through-groove of which a groove length direction forms an included angle with an axial direction of the valve core; and inclination directions of flow channel grooves on stepped shaft sections of two adjacent layers may be opposite to each other.

Preferably, an outer wall of the throttle sleeve may have a conical surface structure with a cross-sectional area increased from top to bottom; a valve seat may be provided at a top end of the throttle sleeve, and a bottom end surface of the valve seat may form a sealing fit with a top end surface of the throttle sleeve; a valve stem may vertically penetrate through the valve cover, then enter into a stepped hole cavity of the throttle sleeve through a coaxial hole at the valve seat, and form a coaxial fixed fit with the valve core; a fluid hole may radially penetrate through the valve seat; the fluid inlet may be located at a side of the valve body, and the fluid outlet may be located at a bottom end of the valve body; and a medium may enter the fluid passage through the fluid hole.

Preferably, a top end surface of the valve core may be sealed against the bottom end surface of the valve seat to form a top end sealing pair; and a throttle area formed at the top end sealing pair may be larger than a throttle area at a first-stage shaft shoulder of the valve core.

Preferably, an inner cavity of the valve core may be shaped as a horn-type counterbore with an opening facing downwards.

Preferably, the fluid outlet may have a bell mouth-shaped structure with a gradually-increasing hole size.

The present invention has the following beneficial effects.

1) The present invention abandons the traditional multistage throttle valve structure and adopts the combination of multi-channel parallel connection and multi-stage series connection. When a valve circuit is closed, each layer of sealing surface formed between the valve core and the throttle sleeve is used to form an axial sealing system to ensure a sealing effect of the entire valve body. When a valve circuit is opened, a radial flow channel formed by the above-mentioned sealing surface cooperates with an axial or oblique flow channel formed in a flow channel groove on each layer to form a complete fluid passage, which can finally meet the requirements of noise reduction and cavitation damage resistance for high-pressure-difference medium control conditions. Specifically, on the one hand, the above-mentioned combination of multi-channel parallel connection and multi-stage series connection is used for flow channel cooperation, such that, after a medium enters the fluid passage through the fluid inlet, a flow direction of the medium will continuously change with the axial/oblique and radial changes of the flow passage, thereby realizing the slow throttling of the fluid. On the other hand, the valve core is formed by a stepped shaft structure with high rigidity, always maintains a strong guiding state with the throttle sleeve, involves relatively-low manufacturing difficulty and cost, and obviously has very prominent vibration resistance, such that the valve core can well adapt to vibration conditions occurring in high-pressure-difference medium control conditions, and can work very safely and stably.

2) The flow channel groove most critical for forming the fluid passage has a variety of specific implementations. A first implementation of the flow channel groove may be a straight or oblique groove structure with a tail end closed, that is, there is a gap between the tail end of the flow channel groove and the hole shoulders or shaft shoulders of the next layer, which is the optimal solution. Due to errors in manufacturing, assembly, and debugging, after the valve core and the throttle sleeve are assembled, a stepped fit formed by the shaft shoulders of the valve core and the hole shoulders of the throttle sleeve cannot be sealed tightly. This implementation can preferentially ensure the sealing of the top end sealing pair while there may be a small gap for a stepped end surface fit between other shaft shoulders and hole shoulders, but the tail end of the flow channel groove is not exposed. The flow channel groove with a tail end closed can ensure that, even if leakage occurs at the above-mentioned sealing, the sealing and throttling effect of the whole valve circuit can be ensured through the sealing fit between an outer wall of the valve core and a cavity wall of the throttle sleeve. A second implementation of the flow channel groove may be a through-groove structure, and this flow channel groove structure requires the above-mentioned sealing surface to be always in a reliable sealing state, which will not be repeated here. In the above implementations, a flow channel groove is arranged on an outer wall of the valve core to facilitate actual manufacturing, which further reduces a manufacturing cycle and cost to improve the market competitiveness.

3) It should be noted that, when the flow channel groove is an oblique groove, inclination directions of flow channel grooves of two adjacent layers should be opposite, which can further increase the resistance to a medium flowing through the flow channel groove and improve the throttling and noise reduction effect. In addition, the inclination directions of flow channel grooves on stepped shaft sections of two adjacent layers are opposite, such that action forces of a fluid flowing through the valve core can compensate each other, which helps to improve the working reliability and actual service life of the present invention.

4) When a same number of flow channel grooves with different specifications are formed on a stepped shaft section of each layer of the valve core, the flow channel grooves of two adjacent layers should be evenly staggered, such that, when a medium flows between the two layers, it is necessary to change a flow direction for diversion or confluence, which can further improve the throttling effect on the medium. A cross-sectional area of flow channel grooves of each layer increases stage by stage in a flow direction of a medium, which is conducive to the stage-by-stage diffusion of the medium and the noise reduction. When different numbers of flow channel grooves with a same specification are formed on stepped shaft sections of different layers of the valve core, the flow channel grooves of two adjacent layers should also be evenly staggered. The flow channel grooves with the same specification can further facilitate the manufacturing of the valve core and avoid the frequent tool or processing program change, which can reduce the manufacturing difficulty and cost. The number of flow channel grooves increases layer by layer, such that the total throttle area can increase stage by stage. The number of flow channel grooves increases layer by layer, such that the number of parallel circuits in each layer increases layer by layer, which can further improve the throttling and noise reduction effects.

5) The valve core and the valve stem can be in an integrated design, and can also be separated structures. Similarly, the valve seat and the throttle sleeve can also be in an integrated design, and a top end sealing pair is formed by the valve seat and the valve core. That is, while a first sealing structure is formed by the shaft shoulders of the valve core and a space of the throttle sleeve, a second sealing structure can also be formed by the valve seat and the valve core. When the present invention is opened, a throttle area formed at the top end sealing pair is larger than a throttle area at shaft shoulders of a first layer of the valve core, such that a maximum flow rate of a medium after throttling occurs downstream of the top end sealing pair, thereby effectively extending a life of the top end sealing pair. During operation, since the fluid inlet is located at a side of the valve body and the fluid outlet is located at a bottom end of the valve body, a medium enters the fluid passage through the fluid hole at the valve seat, and finally flows out through the fluid outlet at the bottom end of the valve body.

6) In fact, the flow channel groove formed on the valve core can also be in other groove shapes, and a cross section of the groove body can be rectangular, triangular, trapezoidal, gear teeth-shaped, or the like. The valve core can also be hollow, which can reduce a weight of the valve core. The valve body is an angle-type structure, that is, a flow direction is from a side to a bottom, in which case the fluid outlet can be designed as a bell mouth-shaped structure with a gradually-increasing hole size to further reduce a flow rate of a medium and improve the actual throttling efficiency.

Figure 1:
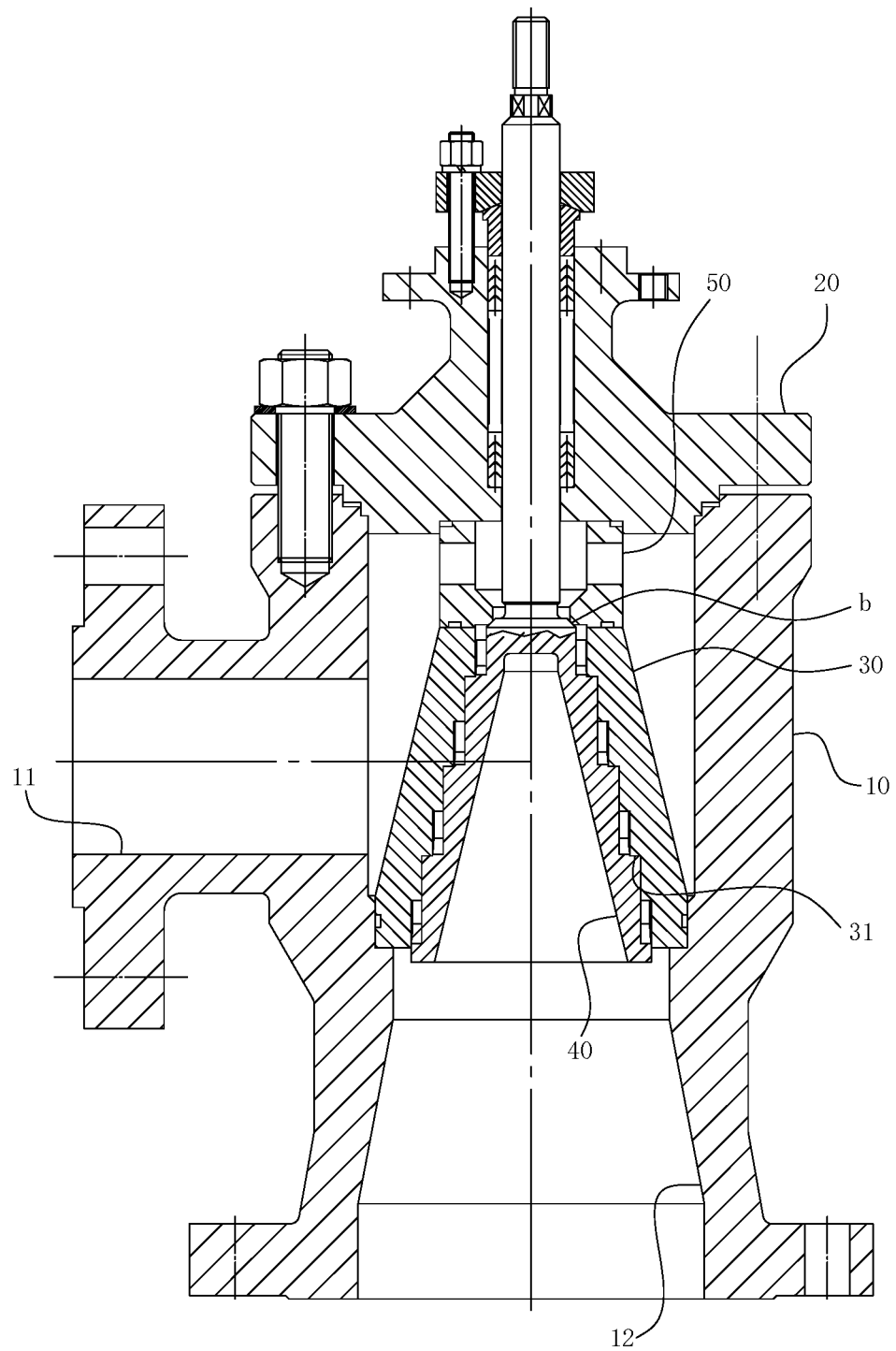
FIG. 1 is a schematic cross-sectional view of the present invention in a closed state.

REFERENCE NUMERALS a represents a flow channel groove and b represents a top end sealing pair;
10 represents a valve body, 11 represents a fluid inlet, and 12 represents a fluid outlet;
20 represents a valve cover;
30 represents a throttle sleeve and 31 represents a hole shoulder;
40 represents a valve core and 41 represents a shaft shoulder;
50 represents a valve seat and 51 represents a fluid hole; and
60 represents a valve stem.

DETAILED DESCRIPTION OF THE EMBODIMENTS

Figure 2:
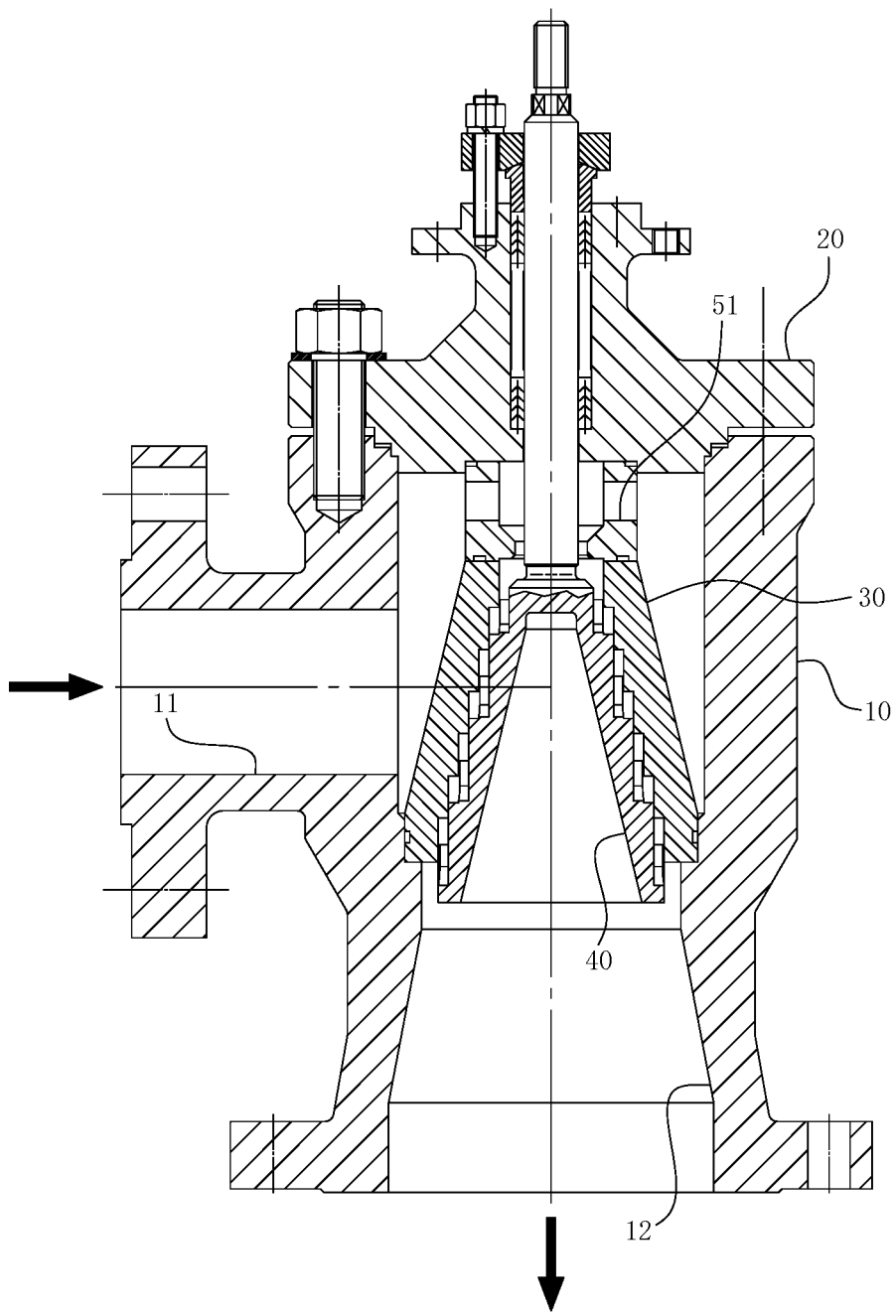
FIG. 2 is a schematic cross-sectional view of the present invention in an opened state.

For ease of understanding, the specific structure and working mode of the present invention are further described below:

A specific implementation structure of the present invention can be seen in FIG. 1 to FIG. 7, and a main structure of the present invention includes a valve body 10, a valve cover 20, a valve core 40, a throttle sleeve 30, a valve seat 50, a valve stem 60, and the like. The valve body 10 in this embodiment is an angle-type structure, in which a fluid inlet 11 penetrates through a side, a fluid outlet 12 penetrates through a bottom, and the fluid outlet 12 is provided with a diameter-expanding section or the fluid outlet 12 itself forms a diameter-expanding structure, as shown in FIG. 1 to FIG. 2.

As shown in FIG. 1 to FIG. 7, the valve core 40 and the throttle sleeve 30 both are stepped, and match with each other in shaft diameter, hole diameter, and length. In other words, in the structure shown in FIG. 1 and FIG. 2, the valve core 40 is shaped as a multi-layer stepped shaft, and a sleeve cavity of the throttle sleeve 30 is shaped as a stepped hole with a corresponding number of layers matching the valve core 40, such that the two form the coaxial sleeve-connected sealing fit shown in the figures. It can be seen from FIG. 3 to FIG. 7, a plurality of flow channel grooves a are formed on a cylindrical stepped surface of a layer of the valve core 40, that is, the flow channel groove a starts from a shaft shoulder 41 of the stepped surface of the layer, extends axially or obliquely in a flow direction of a medium, and finally forms a through-groove or a groove structure with a single end closed. Of course, for the flow channel groove a, the groove structures in FIG. 3 to FIG. 7 may not be adopted, but another groove shape can be adopted. A cross section of the groove body may be rectangular, triangular, trapezoidal, gear teeth-shaped, or the like, as long as the guiding capability of the fluid passage under the stepped structure can be realized.

Of course, the valve core 40 can also be hollow, which can reduce a weight of the valve core 40. If necessary, a lower guiding section can be provided on the valve core 40 to cooperate with a lower guiding sleeve or the valve body 10, and a noise reduction structure can be provided on the lower guiding section to improve the practicability of the overall structure.

When a flow channel groove a is formed, it should be noted that a total throttle area of the flow channel groove a on each layer increases layer by layer in a flow direction of a medium. In other words, when each layer have a same number of flow channel grooves a with a same groove length, the flow channel grooves a on the next layer definitely have a larger axial cross-sectional area than that on the previous layer; and when different layers have different numbers of flow channel grooves a with a same specification, a number of flow channel grooves a on the next layer is definitely larger than that on the previous layer. The flow channel grooves a on each layer are evenly distributed around an axis of the valve core 40, and the flow channel grooves a on two adjacent layers should be staggered evenly to achieve the even diversion or confluence of a medium.

In actual manufacturing, the valve core 40 and the valve stem 60 may be in an integrated design or a separated design, and the valve seat 50 and the throttle sleeve 30 may also be in an integrated design or a separated design. For the top end sealing pair b formed by the valve seat 50 and the valve core 40, when the valve is opened, a throttle area formed at the top end sealing pair b is larger than a throttle area at a stepped shaft section of a first layer, such that a maximum flow rate of a medium after throttling occurs downstream of the top end sealing pair b, thereby effectively extending a life of the top end sealing pair b. In addition, a sealing surface range of the valve core 40 should cover a sealing surface range of the valve seat 50, that is, an outer diameter of a sealing surface of the valve core 40 is larger than an outer diameter of a sealing surface of the valve seat 50, an inner diameter of the sealing surface of the valve core is smaller than an inner diameter of the sealing surface of the valve seat 50, and a hardness of the sealing surface of the valve core 40 is greater than a hardness of the sealing surface of the valve seat 50.

Figure 3:
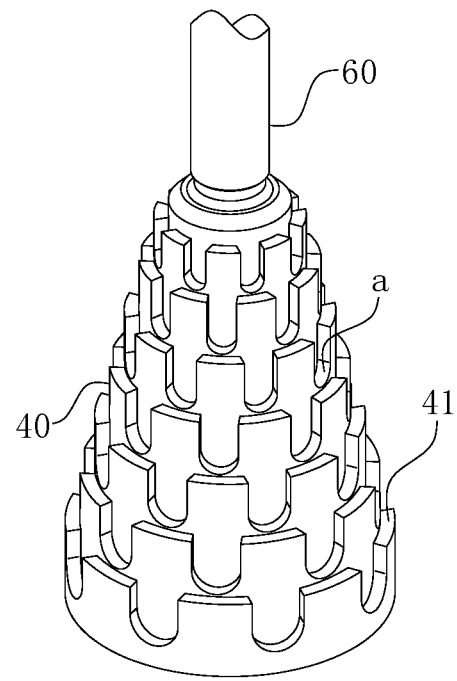
FIG. 3 is a schematic stereoscopic view of the present invention in which the flow channel groove of the valve core is a straight key groove with a tail end closed.
Figure 4:
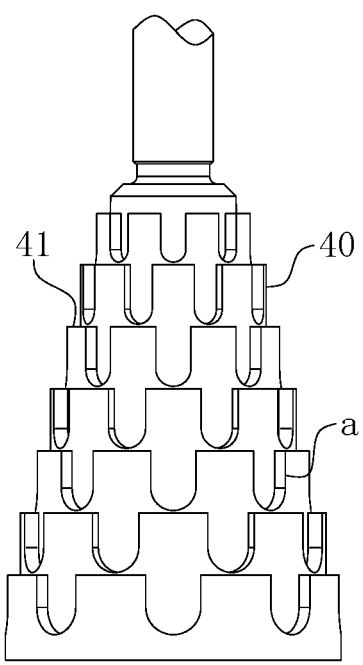
FIG. 4 is a front view of the structure shown in FIG. 3.
Figure 5:
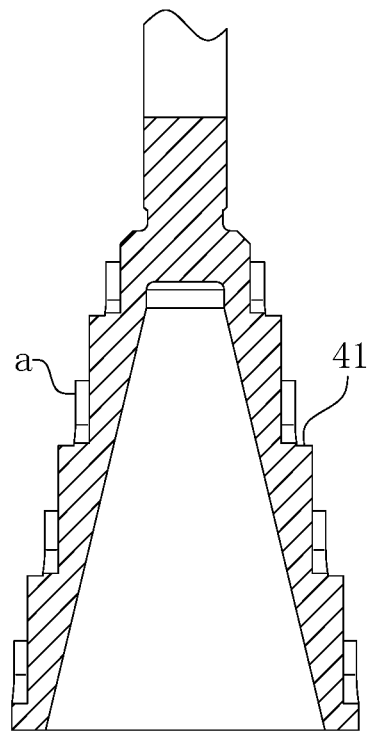
FIG. 5 is a cross-sectional view of the structure shown in FIG. 4.
Figure 6:
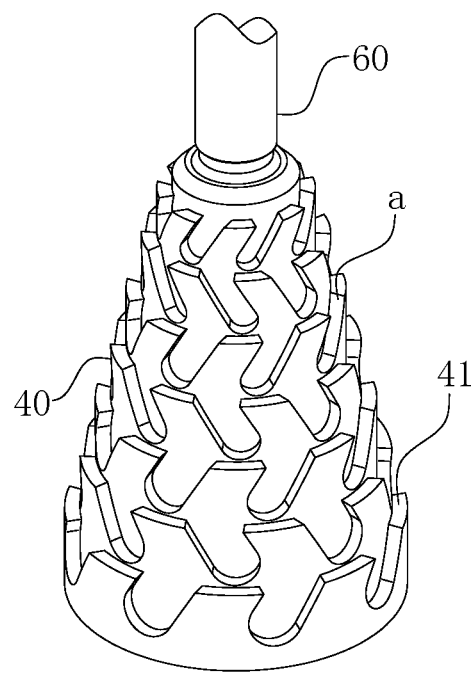
FIG. 6 is a schematic stereoscopic view of the present invention in which the flow channel groove of the valve core is an oblique groove with a tail end closed.
Figure 7:
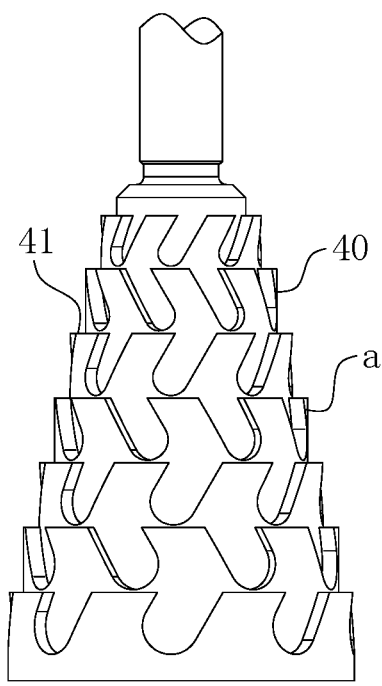
FIG. 7 is a front view of the structure shown in FIG. 6.

In order to facilitate the understanding of the present invention, the adoption of the straight key groove with a tail end closed shown in FIG. 3 to FIG. 5 for the valve core 40 is taken as an example, and a specific use process of the present invention is further described below with reference to FIG. 1 and FIG. 2.

As shown in FIG. 1, the present invention is in a closed state as a whole.

The present invention is opened as shown in FIG. 2, that is, the valve stem 60 is driven to move downwards. Since the valve stem 60 is fixedly connected to the valve core 40, the valve stem 60 will drive the valve core 40 to move downwards, such that the top end sealing pair b formed by the valve core 40 and the valve seat 50 is opened, and the shaft shoulders 41 of the valve core 40 also gradually move away from the hole shoulders 31 of the throttle sleeve 30. As shown in FIG. 3 to FIG. 5, a tail end of the flow channel groove a is of a small distance from the shaft shoulders 41 of the lower layer, that is, when the top end sealing pair b is disengaged, a flow channel groove a on each step of the valve core 40 does not completely move out of a sleeve cavity fitting surface formed by the sleeve cavity of the throttle sleeve 30, that is, the sleeve cavity of the throttle sleeve 30 still forms a sealing fit with a peripheral wall of the valve core 40 in a circumferential direction. Thus, the valve stem 60 needs to further move downwards until the flow channel groove a on the valve core 40 gradually moves out of the sleeve cavity fitting surface of the throttle sleeve 30, such that the fluid passage is enabled as shown in FIG. 2.

When the present invention is opened, as shown by a flow direction arrow in FIG. 2, a high-pressure-difference medium enters from a side inlet (namely, the fluid inlet 11) of the valve body 10, then flows through the fluid hole 51 at the valve seat 50, flows through the fluid passage formed by the valve core 40 and the throttle sleeve 30, then flows to the diameter-expanding section (namely, the fluid outlet 12) of the valve body 10, and finally flows out of the valve body 10.

Finally, it should be noted that the above implementations are merely used to explain the technical solutions of the present invention, and are not intended to limit the same. Although the present invention is described in detail with reference to the preferred examples, those of ordinary skill in the art should understand that various modifications or equivalent substitutions may be made to the technical solutions of the present invention without departing from the spirit and scope of the technical solutions of the present invention. For example, a shape of the flow channel groove a can be simply changed without changing an inherent function, or shapes of the outer wall of the throttle sleeve 30 and the outer wall of the valve body 10 can be simply changed, and even arrangement positions of the fluid inlet 11 and the fluid outlet 12 can be simply changed without affecting a function. Such conventional technical extensions on the basis of the above-mentioned structures should be covered by the claimed scope of the present invention.

What is claimed is:

1. A champagne tower-type multi-stage throttle control valve, comprising a valve body and a valve cover covering the valve body, wherein the valve cover and an inner cavity of the valve body together enclose a valve cavity for arranging a throttle sleeve and a valve core; a fluid inlet and a fluid outlet penetrate through the valve cavity, wherein the fluid inlet and the fluid outlet communicate with an external environment; the valve core is inserted into a sleeve cavity of the throttle sleeve, such that, after a medium enters through the fluid inlet, the medium flows to the fluid outlet through a fluid passage formed between the throttle sleeve and the valve core; the sleeve cavity of the throttle sleeve is shaped as a stepped hole with two or more layers; the valve core is shaped as a stepped shaft with two or more layers, wherein the stepped shaft is coaxial with the throttle sleeve; a number of shaft shoulders of the valve core is smaller than or equal to a number of hole shoulders of the sleeve cavity of the throttle sleeve, such that each set of shaft shoulders of the valve core in an axial direction can forms a sealing surface fit with corresponding hole shoulders of the throttle sleeve; a flow channel groove is axially or obliquely formed on each of the hole shoulders of the throttle sleeve and the shaft shoulders of the valve core, and a flow channel groove on the hole shoulder and a flow channel groove on the shaft shoulder are spaced away from each other; and when the valve core produces an axial displacement action relative to the throttle sleeve until a sealing surface is exposed, the sealing surface formed by the hole shoulders of the throttle sleeve and the shaft shoulders of the valve core communicates with the flow channel grooves to form the fluid passage, wherein the valve core is shaped as a multi-layer stepped shaft and the sleeve cavity of the throttle sleeve is shaped as a stepped hole with a corresponding number of layers matching the valve core, such that the valve core and the throttle sleeve form a coaxial sleeve-connected sealing fit, and wherein an outer wall of the throttle sleeve has a conical surface structure with a cross-sectional area increased from top to bottom; a valve seat is provided at a top end of the throttle sleeve, and a bottom end surface of the valve seat forms a sealing fit with a top end surface of the throttle sleeve; a valve stem vertically penetrates through the valve cover, then enters into a stepped hole cavity of the throttle sleeve through a coaxial hole at the valve seat, and forms a coaxial fixed fit with the valve core; a fluid hole radially penetrates through the valve seat the fluid inlet is located at a side of the valve body, and the fluid outlet is located at a bottom end of the valve body; and a medium enters the fluid passage through the fluid hole.

2. The champagne tower-type multi-stage throttle control valve according to claim 1, wherein from an inlet end of the fluid passage to an outlet end of the fluid passage, a total throttle area of a flow channel groove on a stepped shaft section of each layer of the valve core increases stage by stage; and flow channel grooves on a stepped shaft section of a same layer are axially and evenly distributed around an axis of the valve core, and flow channel grooves on stepped shaft sections of adjacent layers are evenly staggered from each other.

3. The champagne tower-type multi-stage throttle control valve according to claim 2, wherein an outer wall of the throttle sleeve has a conical surface structure with a cross-sectional area increased from top to bottom; a valve seat is provided at a top end of the throttle sleeve, and a bottom end surface of the valve seat forms a sealing fit with a top end surface of the throttle sleeve; a valve stem vertically penetrates through the valve cover, then enters into a stepped hole cavity of the throttle sleeve through a coaxial hole at the valve seat, and forms a coaxial fixed fit with the valve core; a fluid hole radially penetrates through the valve seat; the fluid inlet is located at a side of the valve body, and the fluid outlet is located at a bottom end of the valve body; and a medium enters the fluid passage through the fluid hole.

4. The champagne tower-type multi-stage throttle control valve according to claim 2, wherein an inner cavity of the valve core is shaped as a horn-type counterbore with an opening facing downwards.

5. The champagne tower-type multi-stage throttle control valve according to claim 1, wherein a length of a flow channel groove on a stepped shaft section of each layer of the valve core is smaller than an axial length of the stepped shaft section of the each layer, such that the flow channel groove is shaped as a straight key groove with a tail end closed.

6. The champagne tower-type multi-stage throttle control valve according to claim 5, wherein an outer wall of the throttle sleeve has a conical surface structure with a cross-sectional area increased from top to bottom; a valve seat is provided at a top end of the throttle sleeve, and a bottom end surface of the valve seat forms a sealing fit with a top end surface of the throttle sleeve; a valve stem vertically penetrates through the valve cover, then enters into a stepped hole cavity of the throttle sleeve through a coaxial hole at the valve seat, and forms a coaxial fixed fit with the valve core; a fluid hole radially penetrates through the valve seat; the fluid inlet is located at a side of the valve body, and the fluid outlet is located at a bottom end of the valve body; and a medium enters the fluid passage through the fluid hole.

7. The champagne tower-type multi-stage throttle control valve according to claim 5, wherein an inner cavity of the valve core is shaped as a horn-type counterbore with an opening facing downwards.

8. The champagne tower-type multi-stage throttle control valve according to claim 1, wherein a length of a flow channel groove on a stepped shaft section of each layer of the valve core is smaller than an axial length of the stepped shaft section of the each layer, such that the flow channel groove is shaped as an oblique groove, wherein a tail end of the oblique groove is closed and a groove length direction of the oblique groove forms an included angle with an axial direction of the valve core; and inclination directions of flow channel grooves on stepped shaft sections of two adjacent layers are opposite to each other.

9. The champagne tower-type multi-stage throttle control valve according to claim 8, wherein an outer wall of the throttle sleeve has a conical surface structure with a cross-sectional area increased from top to bottom; a valve seat is provided at a top end of the throttle sleeve, and a bottom end surface of the valve seat forms a sealing fit with a top end surface of the throttle sleeve; a valve stem vertically penetrates through the valve cover, then enters into a stepped hole cavity of the throttle sleeve through a coaxial hole at the valve seat, and forms a coaxial fixed fit with the valve core; a fluid hole radially penetrates through the valve seat; the fluid inlet is located at a side of the valve body, and the fluid outlet is located at a bottom end of the valve body; and a medium enters the fluid passage through the fluid hole.

10. The champagne tower-type multi-stage throttle control valve according to claim 8, wherein an inner cavity of the valve core is shaped as a horn-type counterbore with an opening facing downwards.

11. The champagne tower-type multi-stage throttle control valve according to claim 1, wherein a length of a flow channel groove on a stepped shaft section of each layer of the valve core is equal to an axial length of the stepped shaft section of the each layer, such that the flow channel groove is shaped as a straight through-groove.

12. The champagne tower-type multi-stage throttle control valve according to claim 11, wherein an outer wall of the throttle sleeve has a conical surface structure with a cross-sectional area increased from top to bottom; a valve seat is provided at a top end of the throttle sleeve, and a bottom end surface of the valve seat forms a sealing fit with a top end surface of the throttle sleeve; a valve stem vertically penetrates through the valve cover, then enters into a stepped hole cavity of the throttle sleeve through a coaxial hole at the valve seat, and forms a coaxial fixed fit with the valve core; a fluid hole radially penetrates through the valve seat; the fluid inlet is located at a side of the valve body, and the fluid outlet is located at a bottom end of the valve body; and a medium enters the fluid passage through the fluid hole.

13. The champagne tower-type multi-stage throttle control valve according to claim 11, wherein an inner cavity of the valve core is shaped as a horn-type counterbore with an opening facing downwards.

14. The champagne tower-type multi-stage throttle control valve according to claim 1, wherein a length of a flow channel groove on a stepped shaft section of each layer of the valve core is equal to an axial length of the stepped shaft section of the each layer, such that the flow channel groove is shaped as an oblique through-groove of which a groove length direction forms an included angle with an axial direction of the valve core; and inclination directions of flow channel grooves on stepped shaft sections of two adjacent layers are opposite to each other.

15. The champagne tower-type multi-stage throttle control valve according to claim 14, wherein an outer wall of the throttle sleeve has a conical surface structure with a cross-sectional area increased from top to bottom; a valve seat is provided at a top end of the throttle sleeve, and a bottom end surface of the valve seat forms a sealing fit with a top end surface of the throttle sleeve; a valve stem vertically penetrates through the valve cover, then enters into a stepped hole cavity of the throttle sleeve through a coaxial hole at the valve seat, and forms a coaxial fixed fit with the valve core; a fluid hole radially penetrates through the valve seat; the fluid inlet is located at a side of the valve body, and the fluid outlet is located at a bottom end of the valve body; and a medium enters the fluid passage through the fluid hole.

16. The champagne tower-type multi-stage throttle control valve according to claim 14, wherein an inner cavity of the valve core is shaped as a horn-type counterbore with an opening facing downwards.

17. The champagne tower-type multi-stage throttle control valve according to claim 1, wherein a top end surface of the valve core is sealed against the bottom end surface of the valve seat to form a top end sealing pair; and a throttle area formed at the top end sealing pair is larger than a throttle area at a first-stage shaft shoulder of the valve core.

18. The champagne tower-type multi-stage throttle control valve according to claim 1, wherein an inner cavity of the valve core is shaped as a horn-type counterbore with an opening facing downwards.

19. The champagne tower-type multi-stage throttle control valve according to claim 1, wherein the fluid outlet has a bell mouth-shaped structure with a gradually-increasing hole size.

* * * * *